L. W. GETCHELL.
INSULATED BOX FOR REFRIGERATING OR COOKING FOODSTUFFS.
APPLICATION FILED NOV. 3, 1920.
1,408,937.
Patented Mar. 7, 1922.
3 SHEETS—SHEET 1.
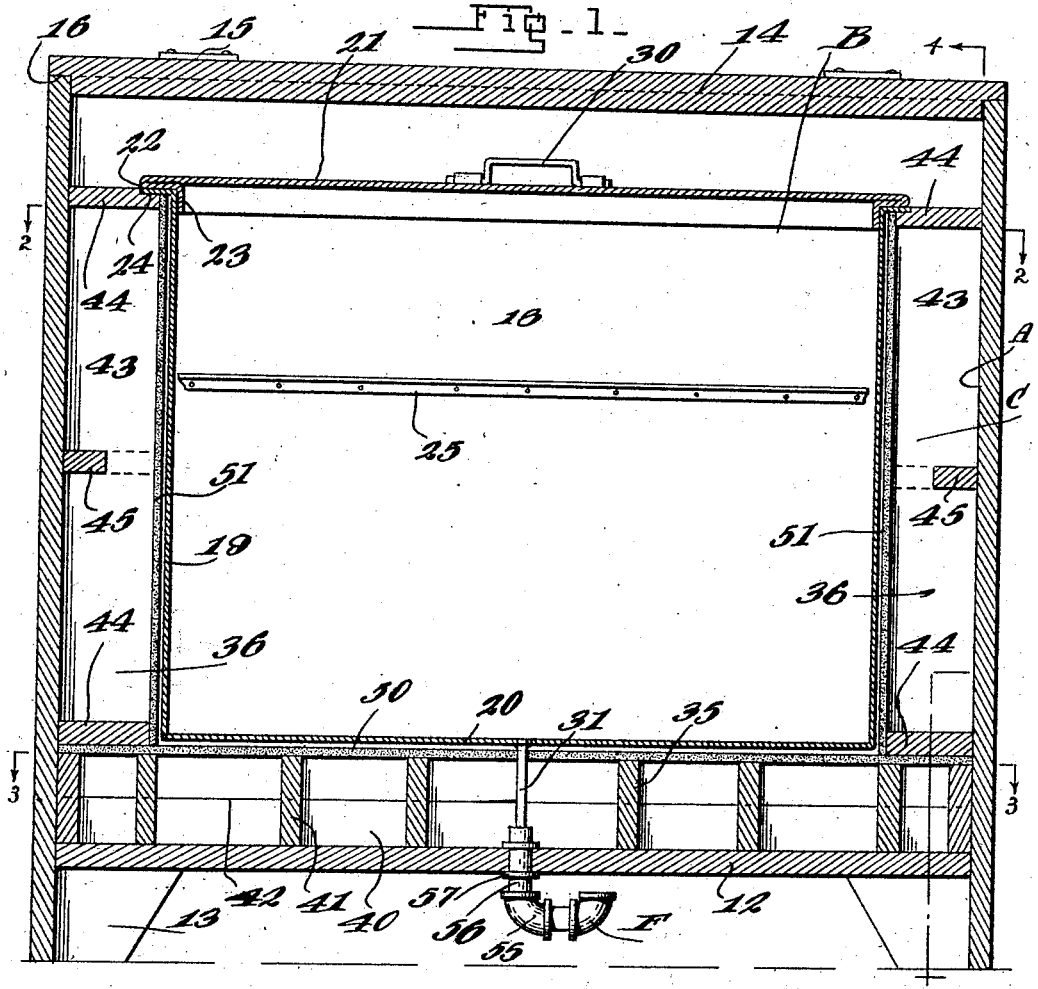
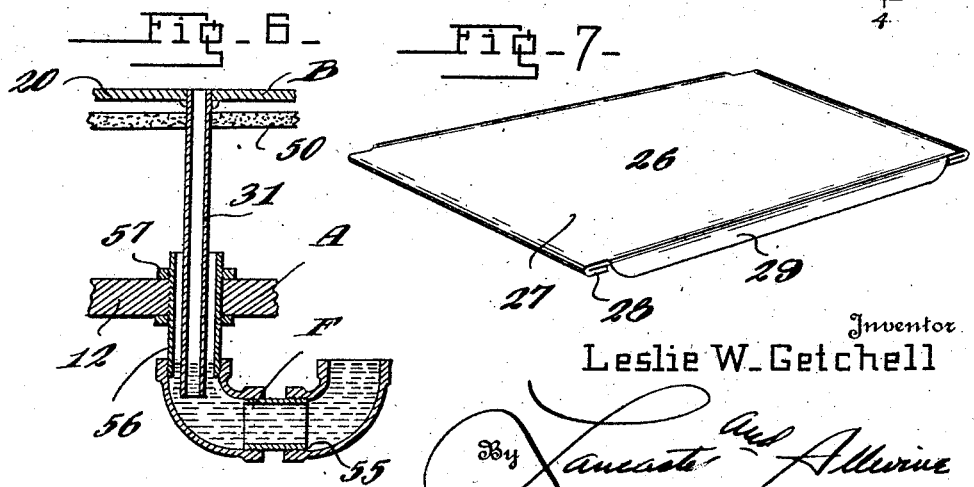
Inventor
Leslie W. Getchell
By Lancaster and Allwine
Attorney

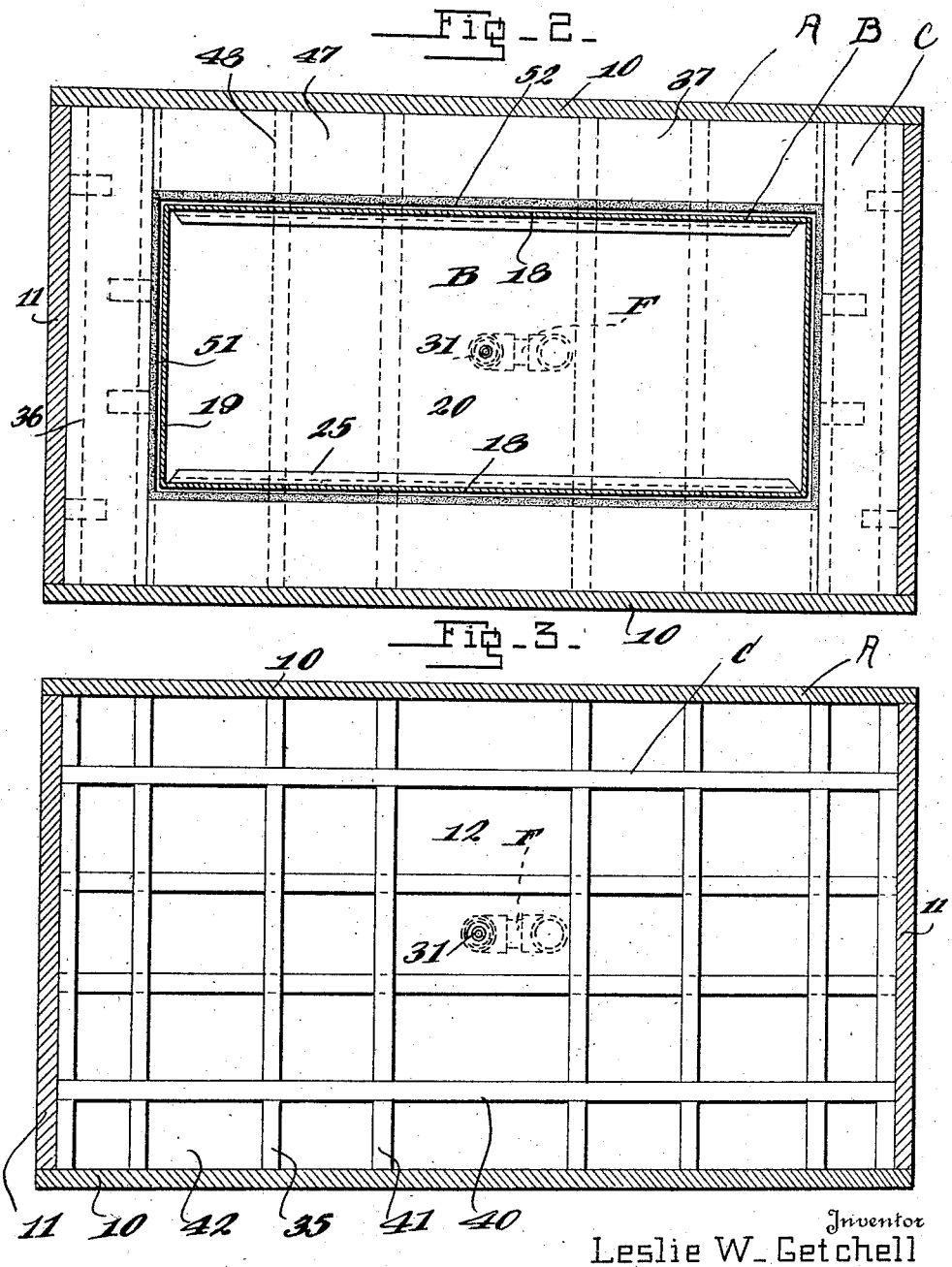

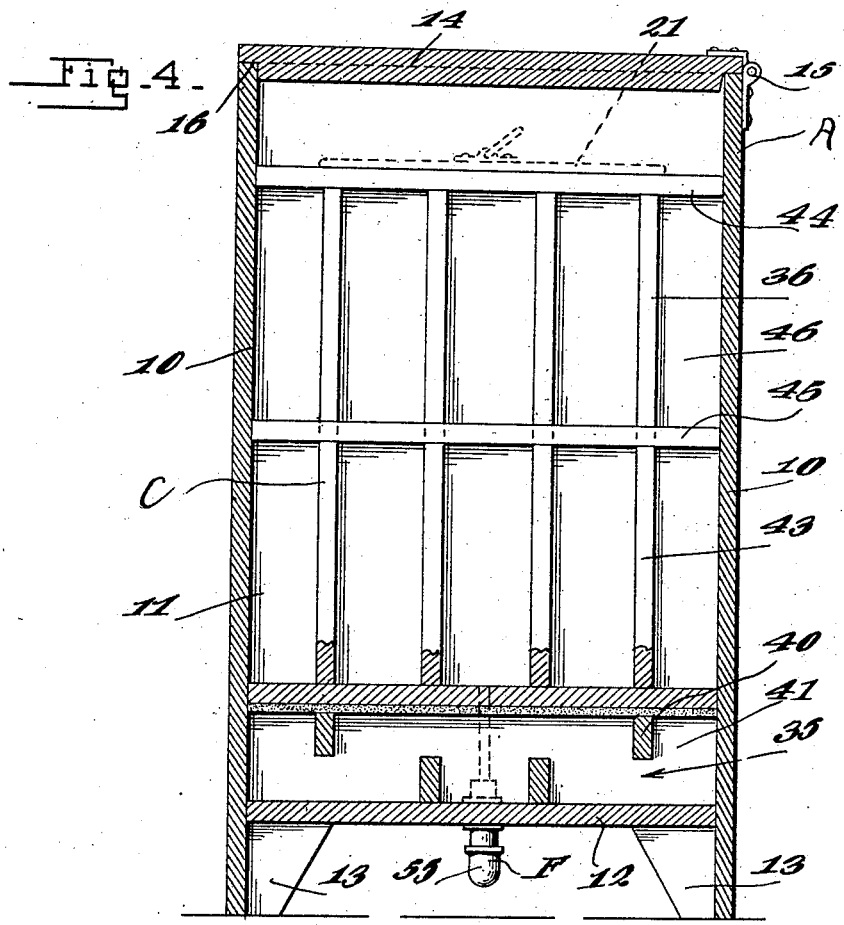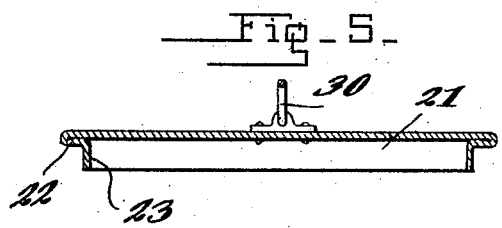

UNITED STATES PATENT OFFICE.

LESLIE W. GETCHELL, OF WATERVILLE, MAINE.

INSULATED BOX FOR REFRIGERATING OR COOKING FOODSTUFFS.

1,408,937.  Specification of Letters Patent.  Patented Mar. 7, 1922.

Application filed November 3, 1920. Serial No. 421,531.

*To all whom it may concern:*

Be it known that I, LESLIE W. GETCHELL, a citizen of the United States, residing at Waterville, in the county of Kennebec and State of Maine, have invented certain new and useful Improvements in Insulated Boxes for Refrigerating or Cooking Foodstuffs, of which the following is a specification.

This invention relates to chests or boxes constructed to resist the action of heat or cold for the purpose of refrigeration or cooking on the heat confining principle, and the primary object of the invention is to provide a device of this character, which will be durable and efficient in use, one that will be simple and easy to manufacture, and one which can be placed upon the market at a small cost.

Another object of this invention is to provide an insulated box for refrigerating or for cooking food stuffs, which is so constructed that a minimum amount of ice will be necessary to keep the contents of the box in a cooled condition for a maximum length of time when used for refrigerating, and which includes a plurality of independent removable frames divided into independent air spaces or cells, the removability of the frames permitting the box to be readily and thoroughly cleaned whereby the same can be kept in a sanitary condition.

A further object of the invention is to provide an improved chest for the confining of heat and cold embodying an outer casing, removable bottom, side and end frames divided into a plurality of dead air cells or spaces, removable plates or sheets of asbestos arranged to engage the inner surfaces of said frames, and a removable closed food receiving compartment.

A still further object of the invention is to provide means for permitting the draining of water from the food compartment formed by the melting of the ice therein, without the entrance of air into the said food compartment.

With these and other objects in view, the invention consists in the novel construction, arrangement and formation of parts as will be hereinafter more specifically described, claimed and illustrated in the accompanying drawings, forming a part of this specification, in which:

Figure 1 is a vertical longitudinal section through the improved device.

Figure 2 is a horizontal section through the improved device taken on the line 2—2 of Figure 1.

Figure 3 is a horizontal longitudinal section taken on the line 3—3 of Figure 1.

Figure 4 is a vertical transverse section taken on the line 4—4 of Figure 1.

Figure 5 is a detail transverse section through the cover for the inner removable food compartment or receptacle.

Figure 6 is an enlarged fragmentary vertical longitudinal section through the lower portion of the improved device illustrating the water trap for the ice drain of the inner food compartment or receptacle, whereby the ingress or egress of air into the compartment is eliminated, and Figure 7 is a perspective view of the shelf utilized for holding food in the inner removable food compartment or receptacle.

Referring to the drawings, in detail, wherein similar reference characters designate corresponding parts throughout the several views, the letter A designates the outer box or casing; B, the inner food compartment or receptacle; C, the removable means for spacing the inner food compartment or receptacle from the outer casing for forming the dead air spaces and F the drain for the inner compartment or receptacle.

The outer casing or box A is preferably constructed from wood or other suitable heat resisting material and includes the side walls 10, the end walls 11 and the bottom wall 12. Suitable corner legs or feet 13 are formed on the lower wall 12 for spacing the lower wall 12 from the floor or other support. The upper open end of the outer casing or box A is closed by a lid 14, and this lid is connected by means of hinges or the like 15 to one side wall 10 of the casing. This upper wall or cover 14 is formed relatively thick and its side edges are rabbeted as at 16 so as to snugly fit the upper edges of the side and end walls of the casing to prevent the ingress or egress of air into the same.

The inner receptacle B which is adapted to receive the food stuffs to be kept in a cool condition or for cooking is preferably formed from sheet metal, such as galvanized iron or the like, and is of a relatively smaller size than the outer casing A so that a space will be formed around the inner retacle. The inner receptacle or compartment B includes the side or longitudinal walls 18, the end or transverse walls 19, and the lower wall 20. The open upper end of the inner compartment is closed by a cover 21. This cover is preferably formed of a single sheet of metal and has its marginal edges bent inwardly as at 22 and then downwardly as at 23 for forming retaining flanges. The upper edges of the side and end walls 18 and 19 of the inner food compartment or receptacle are provided with right angularly extending supporting flanges 24 the purpose of which will be also hereinafter more specifically described. The side supporting brackets 25 formed of angle iron or the like are secured to the side longitudinally extending walls 18 and these side brackets are adapted to support a shelf 26 on which may be placed food or the like. This shelf is of special construction so as to prevent bending or distortion thereof and includes the top elongated flat plate 27 having its ends bent inwardly to provide reinforcing flanges 28 and its guide edges bent downwardly at right angles to provide brace structures 29. Thus it can be seen that a rigid construction is provided, which is prevented from bending or distortion under the weight of any articles which may be placed upon the same.

The cover or lid 21 is provided with a bail handle 30 whereby the same may be readily and quickly removed when so desired. The lower wall 20, if so desired, may be inclined centrally toward the vertically disposed drain pipe 31 so that the water dripping from the ice which may be placed therein will readily drain therefrom.

The exterior of the casing or box A is preferably painted or enamelled white so as to present a pleasing appearance to the eye.

The means C for spacing the inner compartment or receptacle from the outer casing consists of a lower independent frame 35, end independent frames 36 and side independent frames 37. These frames are preferably formed from suitable beams or strips and it can be seen that the lower frame 35 consists of longitudinally extending strips or beams 40 and transverse strips or beams 41. The longitudinally extending strips or beams 40 are preferably arranged in pairs and have their upper and lower surfaces notched respectively for the reception of the transverse beams 41. This forms a plurality of independent dead air cells 42, which prevent the travel of heat or cold from the compartment or inner receptacle B. The end frames 36 include spaced vertical beams 43, upper and lower transverse beams 44, and intermediate transverse beams 45. The transverse beam 45 and the vertically disposed vertical beams 43 are notched to permit one to interfit with the other. This provides the end frames with a plurality of dead air cells 46. As shown the end frames 36 are arranged in abutting relation to the end walls 11 of the casing and on top of the lower frame 35. The side frames 37 are constructed similar to the end frames 36 and include the longitudinally extending strips 47 and the vertically disposed strips 48 which also divide these frames into a plurality of dead air cells. The side frames 37 are placed in abutting relation to the side walls 10 and between the end frames 36 and on the upper surface of the lower frame 35.

In order to further prevent the travel of heat or cold from the inner compartment, plates or sheets of asbestos are arranged around the inner compartment B and as shown the same consists of a lower plate 50 which is removably placed upon the upper surface of the lower frame 35 and end plates or sheets 51 placed between the end frames 36 and inner compartment B and side sheets or plates 52 placed between the side frames 47 and the side walls of the inner compartment B. If so desired the side and end sheets 52 and 51 may be formed integral. These asbestos sheets or plates are freely removable so as to permit the same to be aired so as to keep the device in a cleanly and sanitary condition.

The improved drain F for the drip from the ice in the inner compartment B consists of a U-shaped trap 55 which is carried by a pipe section 56 which is held in place by suitable lock nuts 57 on the lower wall 12 of the outer casing or box A. This trap 55 is adapted to receive the drain pipe 31 carried by the central portion of the inner food compartment or receptacle B and the pipe is adapted to fit within the water caught in the trap for preventing the entrance or exit of air from the inner compartment.

When the improved device is to be used as a refrigerator, the ice is placed therein in the ordinary manner and the food is placed around the ice and on the supporting shelf 26.

When the improved device is to be used as a fireless cooker the ordinary type of hot plates may be placed therein and the food placed around the hot plates or on the shelf 55.

Owing to the simple construction of the device, the same may be placed upon the market at a reasonable cost, and the removability of the food compartment and the spacing devices C permits the device to be kept in a cleanly and sanitary condition.

When it is desired to use the device as a fireless cooker, the trap 55 is filled with water or other cooling fluid so as to prevent the entrance or exit of air into the compartment.

Changes of details may be made without departing from the spirit or scope of this invention; but,

I claim:

1. An insulated box for refrigerating or cooking food stuffs comprising an outer casing, an inner removable food compartment, removable spacing frames arranged between the inner compartment and the outer casing, and heat insulating plates arranged between the frames and the inner compartment.

2. An insulated box for refrigerating or cooking food stuffs comprising an outer casing, a removable rectangular frame arranged within the casing on the lower wall thereof, transverse side removable frames carried by the lower frame and arranged in abutting relation with the end walls of the casing, side rectangular frames arranged within the casing on the upper surface of the lower frame and between the end frames and in abutting relation with the side walls of the casing, an inner removable food container having supporting flanges formed on the upper edge thereof arranged to engage the side and end rectangular frames, a drain trap carried by the outer casing, and a drain pipe carried by the inner food compartment and arranged to removably fit within the drain trap.

3. An insulated chest for refrigerating or cooking food stuffs comprising an outer casing including a lower wall, side and end walls, a hinged cover for the casing, a lower substantially rectangular frame arranged within the casing and in engagement with the lower wall, a heat insulating pad arranged upon the upper surface of the frame, end frames arranged within the casing and in engagement with the end walls thereof and upon the upper surface of the heat insulating pad, heat insulating pads arranged in engagement with the inner faces of the end frames, side frames arranged within the casing and arranged in abutting relation with the side walls thereof, and in engagement with the upper surface of the lower heat insulating pad and the end frames, side heat insulating pads arranged in engagement with the side frames, a food compartment disposed between said heat insulating pads, a removable cover for the food compartment, and means for draining water from said compartment.

4. In an insulating box for refrigerating or cooking food stuffs, an inner food compartment having spaced brackets therein, a supporting shelf arranged to fit on said brackets including a base plate having its terminals provided with abutting reinforcing flanges and right angular reinforcing truss flanges formed on the side edges of the plate.

LESLIE W. GETCHELL.